June 11, 1935.  E. P. HERZOG  2,004,724
MEASURING INSTRUMENT
Filed July 3, 1933
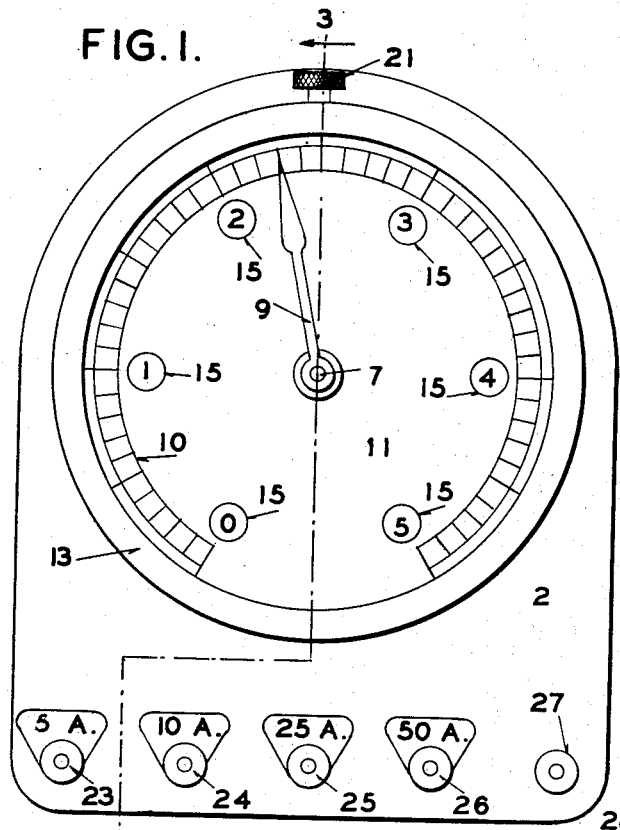
FIG. 1.
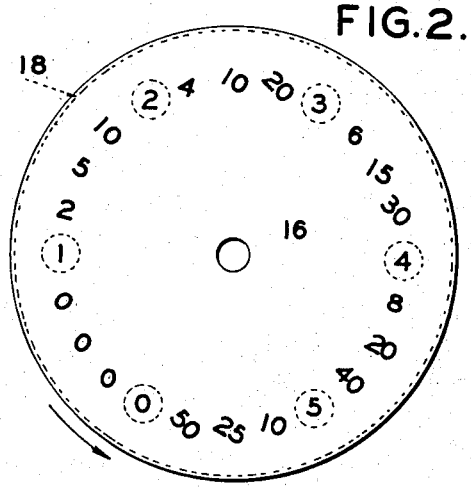
FIG. 2.
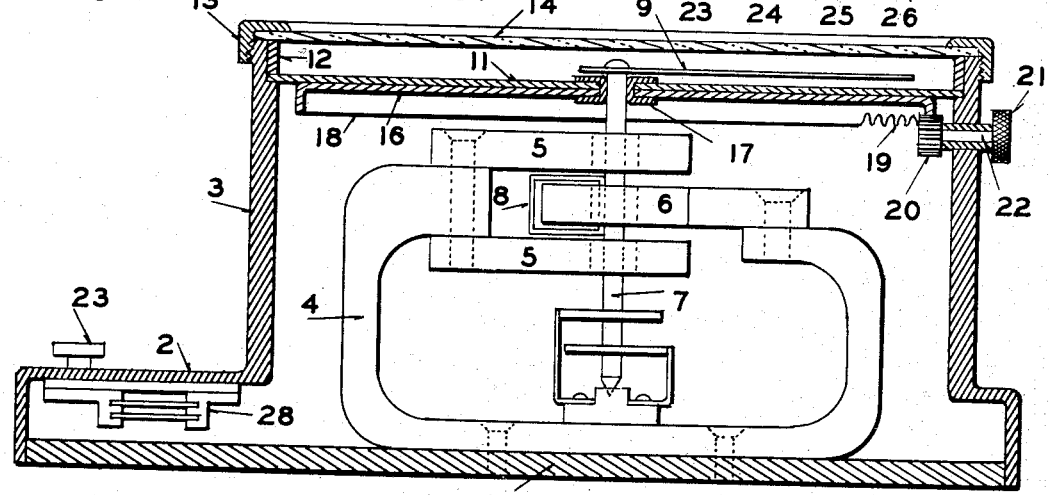
FIG. 4.
FIG. 3.
Inventor
E. P. Herzog
By E. E. Huffman
Att'y.

Patented June 11, 1935

2,004,724

UNITED STATES PATENT OFFICE 2,004,724

MEASURING INSTRUMENT

Erwin P. Herzog, St. Louis, Mo.

Application July 3, 1933, Serial No. 678,737

1 Claim. (Cl. 171—95)

In many kinds of measuring instruments such, for example, as galvanometers for measuring voltage or amperage, tachometers for determining rotating speeds, and the like, it is customary to provide a single instrument having a plurality of working ranges so that the single instrument is the equivalent of two or more instruments of different capacity. It has heretofore been customary in such instruments either to provide a single graduated scale and a set of cooperating numerals, the scale readings of all ranges but one being arrived at by mathematical manipulation, such as shifting the decimal point, or to provide a plurality of simultaneous readings either by means of a plurality of adjacent scales, or by means of a single scale and a plurality of cooperating sets of numerals. Some instruments combine both of these features. All such arrangements are objectionable, either on account of the time consumed in taking the reading, or on account of the liability of error, or both.

The object of the present invention is to avoid these objectionable features by providing a multi-range measuring instrument with a single scale and a plurality of sets of cooperating numerals, only one of said sets of numerals being visible at any reading, whereby a direct unambiguous reading is secured in each range just as in an instrument having a single range.

In the accompanying drawing, which illustrates one form of my invention as applied to an ammeter, Figure 1 is a front elevation; Figure 2 is a top plan view of the numeral bearing disc; Figure 3 is a slightly enlarged section taken on the line 3—3 of Figure 1; and Figure 4 is a wiring diagram.

The housing of the instrument comprises a base plate 1 and a casing 2 provided with a projecting cylindrical portion 3. Secured to the base plate 1 is a permanent magnet 4 carrying on one end a pair of soft iron pole pieces 5 and on the other a soft pole piece 6 projecting between the first named pole pieces. The pole pieces are bored out to permit the passage of the spindle 7 to which is secured the movable coil 8 threading the pole piece 6. Carried on the upper end of the spindle is the hand or pointer 9.

The movement of the pointer is indicated on a graduated scale 10 on a disc 11. This disc is rigidly secured in position by any suitable means, such as being clamped between a shoulder on the cylindrical portion of the casing and a bezel 12. The bezel is held in position by a threaded ring 13 acting through the glass cover 14. Formed in the disc 11 are openings 15. Through these openings are seen a selected set of numerals on a disc 16 arranged behind the disc 11. The two discs are held in movable relation by a flanged collar 17 and the disc 16 is provided with a flange 18 having teeth 19 formed in it through a limited arc of its circumference. These teeth are engaged by a pinion 20 so that the disc 16 may be rotated relatively to the disc 11 by turning a knurled head 21 on a short shaft 22 carrying the pinion on its inner end.

As shown, the ammeter has four ranges, from 0 to 5; from 0 to 10; from 0 to 25; and from 0 to 50, respectively. The desired range is brought into operation by connecting one terminal of the circuit to be tested, to a selected binding post 23, 24, 25 or 26, the other terminal being connected to the common return binding post 27. The binding posts 23, 24, 25 and 26 are each connected to the ammeter through a shunt 28, the capacity of each shunt being selected to give desired operative range to the instrument.

In the operation of the instrument, when one terminal of the circuit to be tested is connected to binding post 23, the disc 16 is positioned as shown in Figure 1 so that the numerals 0, 1, 2, 3, 4, 5 will be exhibited through the openings or windows 15. When the terminal is connected to binding post 24, the disc 16 is rotated in the direction of the arrow (Figure 2) by means of the knurled head until the second set of numerals 0, 2, 4, 6, 8, 10 are seen through the openings. In like manner when binding posts 25 or 26 are used by further rotation of the disc, either the set of numerals 0, 5, 10, 15, 20, 25, or the set 0, 10, 20, 30, 40, 50 is displayed, as desired. It will be seen, therefore, that in each range only a single scale and a single set of numerals are employed, securing simple and direct reading of the scale.

Having fully described my invention, what I claim as new and desire to secure by Letters Patent of the United States is:

In an electrical instrument, the combination with measuring means including a dial and an indicator cooperating therewith, of a plurality of sets of indicia varying in value, said sets being arranged around the dial at equal distances from its axis of rotation in overlapping relation, a plurality of impedances, means for associating with said measuring means a selected impedance to produce varying ranges of measurement, a cover for said dial having a scale and a plurality of openings for exposing the indicia, and means for rotating the dial relative to the cover to bring into visual cooperation with the scale a set of indicia corresponding in value with the range of the selected impedance.

ERWIN P. HERZOG.